US 12,110,723 B2

(12) United States Patent
Matsumoto et al.

(10) Patent No.: US 12,110,723 B2
(45) Date of Patent: Oct. 8, 2024

(54) PROTECTOR WITH SENSOR

(71) Applicants: NISHIKAWA RUBBER CO., LTD., Hiroshima (JP); AISIN CORPORATION, Aichi (JP)

(72) Inventors: Michihiko Matsumoto, Hiroshima (JP); Hirofumi Nakai, Hiroshima (JP); Wataru Hattori, Kariya (JP)

(73) Assignees: NISHIKAWA RUBBER CO., LTD., Hiroshima-Ken (JP); AISIN CORPORATION, Aichi (JP)

( * ) Notice: Subject to any disclaimer, the term of this patent is extended or adjusted under 35 U.S.C. 154(b) by 13 days.

(21) Appl. No.: 17/713,391

(22) Filed: Apr. 5, 2022

(65) Prior Publication Data

US 2022/0325570 A1    Oct. 13, 2022

(30) Foreign Application Priority Data

Apr. 7, 2021    (JP) ................... 2021-065193

(51) Int. Cl.
  *E05F 15/44*    (2015.01)
  *B60J 5/04*    (2006.01)
(52) U.S. Cl.
  CPC ............ *E05F 15/44* (2015.01); *B60J 5/0468* (2013.01); *E05Y 2400/852* (2013.01); *E05Y 2800/41* (2013.01); *E05Y 2900/531* (2013.01)
(58) Field of Classification Search
  CPC ......... E05F 15/44; E05F 15/443; E05F 15/46; B60J 5/0468
  See application file for complete search history.

(56) References Cited

U.S. PATENT DOCUMENTS

| 6,107,580 | A | 8/2000 | Hoshikawa et al. | |
| 9,441,408 | B2 * | 9/2016 | Matsumoto | H01H 3/142 |
| 11,306,528 | B2 * | 4/2022 | Matsumoto | B60J 10/273 |
| 11,325,544 | B2 * | 5/2022 | Matsumoto | B60R 16/0232 |
| 2011/0241705 | A1 * | 10/2011 | Suhara | G01D 5/2417 |
| | | | | 324/679 |
| 2015/0267453 | A1 * | 9/2015 | Matsumoto | B60J 5/06 |
| | | | | 49/27 |

(Continued)

FOREIGN PATENT DOCUMENTS

| DE | 102008035634 A1 * | 2/2010 | ............. E05F 15/46 |
| EP | 654575 A1 * | 5/1995 | ............. B60J 10/00 |

(Continued)

*Primary Examiner* — Marcus Menezes
(74) *Attorney, Agent, or Firm* — Holtz, Holtz & Volek PC

(57) ABSTRACT

An inner-cabin side part of a hollow part of a protector with a sensor extends between a top end and an inner-cabin side end with an inner-cabin side apex closest to an interior of an automobile body. An outer-cabin side part of the hollow part extends between the top end and an outer-cabin side end with an outer-cabin side apex closest to an exterior of the automobile body. Distances are shorter between the apexes and the ends than between the top end and the apexes. A first conductive part includes parts closer to an installation base member than an apex of a second conductive part. Lower ends of the first conductive part have protrusions formed. The protrusions extend to protrude toward the second conductive part from an inner surface of an outer coat of the hollow part and are formed on uneven bases.

2 Claims, 10 Drawing Sheets

(56) References Cited

U.S. PATENT DOCUMENTS

| | | | |
|---|---|---|---|
| 2016/0145927 A1* | 5/2016 | Hirakawa | B60J 10/273 296/1.04 |
| 2018/0364387 A1 | 12/2018 | Hattori et al. | |
| 2021/0107340 A1* | 4/2021 | Ishibashi | B60J 5/0468 |
| 2021/0109246 A1* | 4/2021 | Matsumoto | B60J 10/24 |

FOREIGN PATENT DOCUMENTS

| | | | |
|---|---|---|---|
| EP | 1715128 A2 * | 10/2006 | E05F 15/44 |
| EP | 3023279 A1 * | 5/2016 | B60J 5/0495 |
| JP | H11283462 A | 10/1999 | |
| JP | H11306911 A | 11/1999 | |
| JP | 2015174633 A | 10/2015 | |
| JP | 2016097809 A | 5/2016 | |
| JP | 2018065541 A | 4/2018 | |
| JP | 2019008879 A | 1/2019 | |
| JP | 2021062664 A | 4/2021 | |
| JP | 2021062665 A | 4/2021 | |

* cited by examiner conductive member at lower limit position
conductive member at the center
conductive member at upper limit position

PROTECTOR WITH SENSOR

REFERENCE TO RELATED APPLICATIONS

This application claims the benefit under 35 USC § 119 of JP Patent Application JP 2021-065193 filed Apr. 7, 2021, the entire disclosure of which is incorporated herein by reference.

BACKGROUND OF THE INVENTION

The present invention relates to a protector with a sensor. When an object including a finger is disposed between a sliding door of an automobile and a door opening of an automobile body of the automobile, and makes contact with the protector when the sliding door is moved towards a closed position, an electric signal provides an indication that the object is in the opening. The sliding door is for use on a wagon, a station wagon, or the like and moves between at least two positions to open and close the opening.

A protector 10 with a sensor couples to a flange F of a sliding door 1 of the automobile including a wagon illustrated in FIG. 9. The sliding door 1 opens and closes the opening.

The flange F protrudes toward a front part of the automobile body from a front edge of the sliding door 1. The protector 10, which couples to the flange F, protrudes toward the front part of the automobile body and extends in an upper and lower direction of the automobile body as illustrated in FIG. 10.

In this connection, Japanese unexamined Patent Publication No. 2015-174633 is directed to the protector 10. As illustrated in FIG. 11 and FIG. 12, the protector 10 includes an installation base member 11 and a hollow part 12. The installation base member 11 couples to the flange F on the front edge of the sliding door 1, and has a substantially U-shaped cross section including an inner-cabin side wall 11a, an outer-cabin side wall 11b, and a connecting wall 11c. The hollow part 12 is integrally formed with the installation base member 11. The hollow part 12 includes a sensor (pressure sensitive sensor) S. When the object including part of a human body, e.g. fingers, hands, or legs is disposed between the sliding door 1 and the opening (may also be a front door or a side door), and makes contact with the hollow part 12, the electric signal provides the indication that the object is in the opening.

An outer peripheral surface of the hollow part 12 is an outer coat 12a. The outer coat 12a has a substantially U-shaped cross section and has an inner-cabin side end 12b and an outer-cabin side end 12c. The inner-cabin side end 12b is connected with a right side part of the installation base member 11 and the outer-cabin side end 12c is connected with a left side part, and are at a distance from each other along the installation base member 11.

On a lower part of the protector 10, a channel part 13 is integrally formed with the inner-cabin side wall 11a. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b.

The sensor S is fixed in the hollow part 12. The hollow part 12 has two core wires (electrode wires) 31, 32, rubber like elastic bodies (first and second conductive parts) 34, 35, and a space 33. The core wires 31, 32 extend in an upper and lower direction, or longitudinal direction, of the hollow part 12 and are embedded in the rubber like elastic bodies 34, 35. The rubber like elastic bodies 34, 35 have electric conductivity. The space 33 is positioned between the rubber like elastic bodies 34, 35. When the object is disposed between the sliding door 1 and the opening, and makes contact with the hollow part 12 when the sliding door 1 is moved towards a closed position, the rubber like elastic bodies 34, 35 come into contact with each other and the two core wires 31, 32 short-circuit. Resultant change in electric signal is transmitted to a control unit 60 by leads 36, 36, and as a result, the object is detected. The leads 36, 36 are connected with the two core wires 31, 32 in a lower side terminal part of the protector 10. The leads 36, 36 are covered with insulator and are tied by the wire harness W. Top ends of the leads 36, 36 are bared from covered parts 37 and are naked wires.

The rubber like elastic bodies 34, 35 include the first conductive part 34 on an upper part of the hollow part and the second conductive part 35 on a lower part of the hollow part. The first conductive part 34 has a concave shape and the second conductive part 35 has a convex shape in cross section of the hollow part 12. The first and second conductive parts 34, 35 are shaped and positioned in a manner that the space 33, positioned between the first and second conductive parts 34, 35, has a substantially U-shaped cross section, the space 33 has a substantially uniform width in cross section, and an opening of the U-shaped cross section faces the installation base member 11. This configuration widens a range for the sensor S to detect the objects.

Parts of an inner peripheral surface of the hollow part 12 without the first and second conductive parts 34, 35, in other words where an inner-cabin space end 33a and an outer-cabin space end 33b of the space 33 are defined, are weak in strength. The parts weak in strength can be damaged or torn if strongly touched by a convex substance Z, key for example, while passengers are getting on or off the automobile. In this connection, as illustrated in FIG. 11, thicknesses of the inner-cabin side end 12b and the outer-cabin side end 12c have been increased. This is effective, for the parts where the inner-cabin space end 33a and the outer-cabin space end 33b are defined are easy to catch the convex substance Z and therefore are easily damaged or torn.

Once the hollow part 12 is torn, rainwater or water for car washing infiltrates and sensor function is lost. The absence of the sensor function may cause malfunction including improper opening or closing of the sliding door 1.

Japanese unexamined Patent Publication No. 2016-097809 is directed to a hollow part that has a substantially lozenge-shaped cross section. A first apex of the hollow part has a curved surface that is curved toward an exterior of the automobile body, and a second apex of the hollow part has a curved surface that is curved toward an interior of the automobile body, to release force applied on the hollow part from the convex substance Z. Unfortunately, however, this configuration decreases rigidity of parts of the hollow part closer to a first base root than the first apex and closer to a second base root than the second apex for the following reasons. First, a distance between the first and second base roots of the hollow part are too short from each other along the installation base member. Second, distances between the first apex and the first base root and between the second apex and the second base root are long, for the first and second apexes are at substantial centers between an upper end of the hollow part and the first and second base roots. The hollow part easily leans when the convex substance Z diagonally touches the hollow part relative to the flange F, and is decreased in precise sensitivity required for tactile detection of the objects.

Unfortunately, however, the inner-cabin side end 12b and the outer-cabin side end 12c illustrated in FIG. 11 and FIG. 12, which are increased in thicknesses, form pillar parts. The pillar parts increase load to be applied on the hollow part 12.

In other words, the pillar parts prevent the hollow part 12 from bending in a front and rear direction of the automobile body. This configuration can degrade precise sensitivity of the sensor S for detecting the objects.

The protector 10 illustrated in FIGS. 11 and 12 and disclosed in Japanese unexamined Patent Publication No. 2015-174633 includes the first conductive part 34 of which lower ends are gradually decreased in thickness toward a lower part in the hollow part 12 and disappear. The lower ends are referred to as "edge shapes" hereinafter.

The edge shapes of the lower ends of the first conductive part 34, which are formed by extrusion molding, are hard to place on a predetermined position of the hollow part 12 in cross section and can lead to unevenness. Also, dies that have been used to form the edge shapes by extrusion molding are hard to manufacture.

Pressure vertically applied on the hollow part 12 from the convex substance Z toward the lower part of the hollow part 12 from the upper part, referred to as pressurization at an angle of 0 degree, leads to an appropriate contact. But pressure diagonally applied on the hollow part 12, with an inclination of 70 degrees toward an interior or an exterior of the automobile body relative to a vertical direction, for example, bends thin parts on the lower ends of the first conductive part 34. This leads to an inappropriate contact of the thin parts with the second conductive part 35. The pressure diagonally applied, referred to as diagonal pressurization at the angle of 70 degrees, is relative to the vertical direction toward a lower part of the hollow part 12 from an upper part, or toward a rear part of the automobile body from a front part.

In addition, any unevenness as well as the inappropriate contact can keep a resistance value of an electric current large between the first and second conductive parts 34, 35 when the first and second conductive parts 34, 35 are in contact with each other, and hamper drop in the resistance. The large resistance value can yield an area that does not sense an ON resistance. The unevenness includes geometric unevenness of the protector 10 in cross section when formed by extrusion molding, geometric unevenness of the automobile when manufactured, and positional unevenness of the protector 10 when coupled to the automobile.

To solve the above problems, it is an object of the present invention to provide a protector that has advanced resistance to damages from the objects and improved sensibility with a sensor.

SUMMARY OF THE INVENTION

To achieve the above object, an aspect of the present invention provides a protector (50) with a sensor. The protector (50) couples to a flange (F) of a sliding door (1) of an automobile. The flange (F) protrudes toward a front part of an automobile body of the automobile from a front edge of the sliding door (1). The sliding door (1) moves between at least two positions to open and close a door opening of the automobile body. The protector (50) includes an installation base member (11) and a hollow part (52).

The installation base member (11) couples to the flange (F). The installation base member (11) has a substantially U-shaped cross section including an inner-cabin side wall (11a), an outer-cabin side wall (11b), and a connecting wall (11c). The connecting wall (11c) connects the side walls (11a, 11b). The installation base member (11) extends in an upper and lower direction of the automobile body.

The hollow part (52) is unified with the connecting wall (11c) of the installation base member (11) and extends toward the front part of the automobile body. The hollow part (52) has a shape of a tube. The hollow part (52) has core wires (31, 32), first and second conductive parts (54, 55), and a space (53). Each of the first and second conductive parts (54, 55) have a respective one of the core wires (31, 32) embedded. The space (53) is positioned between the first and second conductive parts (54, 55).

The hollow part (52) has an inner-cabin side end (52b) and an outer-cabin side end (52c). Each of the inner-cabin side end (52b) and the outer-cabin side end (52c) are connected with the installation base member (11). The inner-cabin side end (52b) and the outer-cabin side end (52c) are at a distance from each other along the installation base member (11).

The first and second conductive parts (54, 55) include the first conductive part (54) on an upper part of the hollow part and the second conductive part (55) on a lower part of the hollow part. The second conductive part (55) has a convex shape in cross section of the hollow part (52). The second conductive part (55) is positioned within the hollow part (52) between the inner-cabin side end (52b) and the outer-cabin side end (52c) adjacent the installation base member (11). The first conductive part (54) has a concave shape in cross section of the hollow part (52). The first conductive part (54) is spaced apart from the second conductive part (55). The first and second conductive parts (54, 55) are shaped and positioned in a manner that the space (53) has a substantially U-shaped cross section, an opening of the U-shaped cross section faces the installation base member (11), and an inner-cabin space end (53a) and an outer-cabin space end (53b) of the space (53) are defined on an inner surface of an outer coat (52a) of the hollow part (52).

When an object is disposed between the sliding door (1) and the opening, and makes contact with the hollow part (52) when the sliding door (1) is moved towards a closed position, an electric signal provides an indication that the object is in the opening.

An inner-cabin side part of the outer coat (52a) of the hollow part (52) extends between a top end (P) and the inner-cabin side end (52b). The inner-cabin side part is curved toward an interior of the automobile body with an inner-cabin side apex (52d) on a part closest to the interior of the automobile body. A distance (L5) in a height direction between the inner-cabin side apex (52d) and a part (Q) of the inner-cabin side end (52b) closest to the interior of the automobile body is shorter than a distance (L4) in the height direction between the top end (P) and the inner-cabin side apex (52d).

An outer-cabin side part of the outer coat (52a) of the hollow part (52) extends between the top end (P) and the outer-cabin side end (52c). The outer-cabin side part is curved toward an exterior of the automobile body with an outer-cabin side apex (52e) on a part closest to the exterior of the automobile body. A distance (L7) in the height direction between the outer-cabin side apex (52e) and a part (R) of the outer-cabin side end (52c) closest to the exterior of the automobile body is shorter than a distance (L6) in the height direction between the top end (P) and the outer-cabin side apex (52e).

The first conductive part (54) includes parts closer to the installation base member (11) than an apex (55a) of the second conductive part (55).

Each of lower ends of the first conductive part (54) have a respective one of protrusions (D) formed. Each of the protrusions (D) extend to protrude toward the second conductive part (55) from the inner surface of the outer coat (52a) of the hollow part (52) and are formed on a respective one of uneven bases.

It is to be noted that the "electric signal" includes a change by short between the two core wires, and a change in capacitance.

In addition, according to an aspect of the present invention, the outer coat (52a) of the hollow part (52) has a substantially uniform thickness (M1, M2, M3) in cross section between the top end (P) (thickness M1) and a part (thickness M2) of the outer coat (52a) closer to the inner-cabin side apex (52d) than the top end (P) and between the top end (P) (thickness M1) and a part (thickness M3) of the outer coat (52a) closer to the outer-cabin side apex (52e) than the top end (P).

The first conductive part (54) including the parts closer to the installation base member (11) than the apex (55a) of the second conductive part (55) has a thickness (N1, N2, N3) greater than the thickness (M1, M2, M3) of the outer coat (52a) of the hollow part (52).

In addition, according to an aspect of the present invention, the thicknesses of the outer coat (52a) of the hollow part (52) are gradually increased toward the installation base member (11) from the inner-cabin side apex (52d) and from the outer-cabin side apex (52e).

In addition, according to an aspect of the present invention, the second conductive part (55) has a ridge-shaped cross section, the ridge-shaped cross section has the apex (55a) thicker than at least one other part of the second conductive part (55) and slopes toward the inner-cabin side end (52b) and the outer-cabin side end (52c) from the apex (55a), and the space (53) has a substantially uniform width in cross section.

In addition, according to an aspect of the present invention, the second conductive part (55) has a hanging-bell-shaped cross section, the space (53) has widths (Y1, Y2) on the inner-cabin side apex (52d) and on the outer-cabin side apex (52e) greater than at least one other part of the space (53), and the widths (Y1, Y2) of the space (53) are gradually decreased toward the installation base member (11) from the inner-cabin side apex (52d) and from the outer-cabin side apex (52e).

In addition, according to an aspect of the present invention, the inner-cabin space end (53a) and the outer-cabin space end (53b) of the space (53) have curved surfaces and are defined on the inner surface of the outer coat (52a) of the hollow part (52).

Symbols in parentheses show constituents or items corresponding to the drawings.

According to the present invention, the inner-cabin side part of the outer coat of the hollow part extends between the top end and the inner-cabin side end, and is curved toward the interior of the automobile body with the inner-cabin side apex on the part closest to the interior of the automobile body. The outer-cabin side part of the outer coat of the hollow part extends between the top end and the outer-cabin side end, and is curved toward the exterior of the automobile body with the outer-cabin side apex on the part closest to the exterior of the automobile body. This configuration improves bendability of the hollow part in the front and rear direction of the automobile body in the same manner as a pantograph and sensibility of the sensor.

In addition, the distance in the height direction between the inner-cabin side apex and the part of the inner-cabin side end closest to the interior of the automobile body is shorter than the distance in the height direction between the top end and the inner-cabin side apex. In the same manner, the distance in the height direction between the outer-cabin side apex and the part of the outer-cabin side end closest to the exterior of the automobile body is shorter than the distance in the height direction between the top end and the outer-cabin side apex. In other words, the distances between the inner-cabin side and outer-cabin side apexes and base roots are shorter on the inner-cabin side part and the outer-cabin side part of the hollow part than the distances between the top end and the inner-cabin side and outer-cabin side apexes. This configuration increases rigidity of parts of the hollow part closer to the base roots than the inner-cabin side and the outer-cabin side apexes. Accordingly, the hollow part hardly leans when a convex substance diagonally touches the hollow part relative to the flange, and is hardly decreased in precise sensitivity required for tactile detection of the objects.

In addition, the first conductive part includes the parts closer to the installation base member than the apex of the second conductive part. Also, each of the lower ends of the first conductive part have the respective one of protrusions formed. Each of the protrusions extend to protrude toward the second conductive part from the inner surface of the outer coat of the hollow part and are formed on the respective one of uneven bases. This configuration eliminates "edge shapes" known in the art on the lower ends of the first conductive part.

This configuration eliminates the need for the manufacture of dies as well. The dies that have been used to form the edge shapes by extrusion molding are difficult to manufacture.

Also, the protrusions that extend to protrude and are formed on the uneven bases increase thicknesses of the lower ends of the first conductive part. The thick parts on the lower ends keep the precise sensitivity required for tactile detection of the objects stable when the convex substance diagonally approaches and touches the hollow part, with an inclination of 70 degrees toward an interior or an exterior of the automobile body relative to a front and rear direction of the automobile body, for example, to bend and bring the thick parts into contact with the second conductive part. On the other hand, the thin parts, not the thick parts, on the lower ends of the first conductive part can degrade the precise sensitivity under the same condition.

In addition, the outer coat of the hollow part has the substantially uniform thickness in cross section between the top end and the part of the outer coat closer to the inner-cabin side apex than the top end and between the top end and the part of the outer coat closer to the outer-cabin side apex than the top end. Also, the first conductive part including the parts closer to the installation base member than the apex of the second conductive part has the thickness greater than the thickness of the outer coat of the hollow part. This configuration hardly yields an area that does not sense an ON resistance under the unevenness such as geometric unevenness of the protector in cross section when formed by extrusion molding, geometric unevenness of the automobile when manufactured, and positional unevenness of the protector when coupled to the automobile, and keeps the precise sensitivity more stable.

In addition, according to an aspect of the present invention, the thicknesses of the outer coat of the hollow part are gradually increased toward the installation base member from the inner-cabin side apex and from the outer-cabin side apex. This configuration keeps deformation volume smaller in the inner-cabin and outer-cabin direction of the hollow part, and keeps friction as well as amount of bite by the convex substance lower.

Accordingly, if the convex substance, key for example, strongly touches the parts of the hollow part increased in thickness while passengers are getting on or off the automobile, the parts would not be damaged or torn. The hollow part, not damaged or torn, prevents infiltration of water, and therefore, sensor function is not affected. This configuration prevents malfunction including improper opening or closing of the sliding door.

In addition, according to an aspect of the present invention, the second conductive part has the ridge-shaped cross section. The ridge-shaped cross section has the apex thicker than at least one other part of the second conductive part and slopes toward the inner-cabin side end and the outer-cabin side end from the apex, and the space has the substantially uniform width in cross section. Alternatively, the second conductive part may have the hanging-bell-shaped cross section. The space has the widths on the inner-cabin side apex and on the outer-cabin side apex greater than at least one other part of the space, and the widths of the space are gradually decreased toward the installation base member from the inner-cabin side apex and from the outer-cabin side apex. The second conductive part that has the hanging-bell-shaped cross section keeps the deformation volume in the inner-cabin and outer-cabin direction, and abrasion and amount of bite by the convex substance, key for example, of the hollow part lower than the ridge-shaped cross section.

In addition, the inner-cabin space end and the outer-cabin space end of the space have curved surfaces and are defined on the inner surface of the outer coat of the hollow part. This configuration improves further bendability of the hollow part in the front and rear direction of the automobile body and sensibility of the sensor.

DETAILED DESCRIPTION

Figure 1:
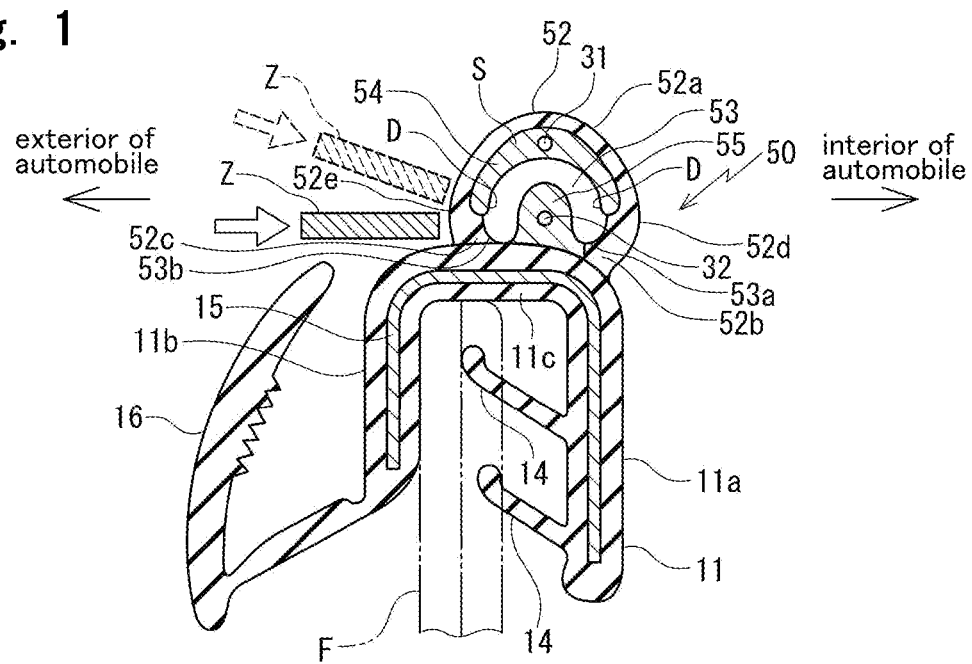
FIG. 1 is an enlarged cross-sectional view of a protector according to an embodiment of the present invention taken along line I-I of FIG. 10 with a sensor.

Referring to the Drawings, a protector 50 according to an embodiment of the present invention with a sensor will be described. It is to be noted that "front and rear" indicates a front and rear direction of an automobile body of an automobile. "Upper and lower" used with respect to the automobile body indicates an upper and lower direction of the automobile body. "Upper" used with respect to the protector 50 indicates part closer to a hollow part 52 and "lower" indicates part closer to an installation base member 11.

Figure 9:
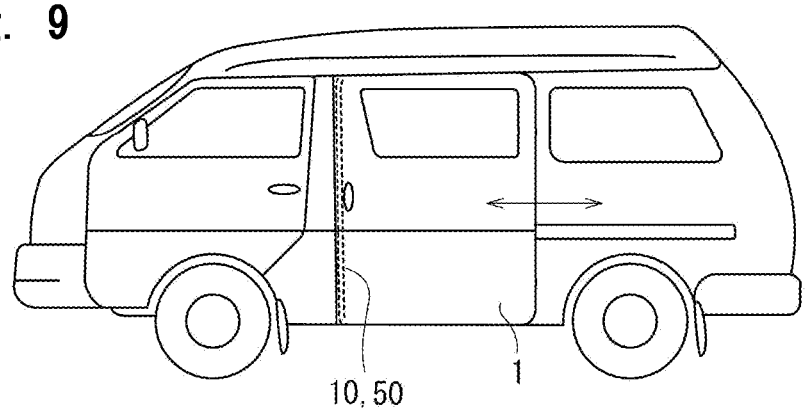
FIG. 9 is a side view of an automobile with a sliding door that opens and closes a door opening of an automobile body of an automobile.
Figure 10:
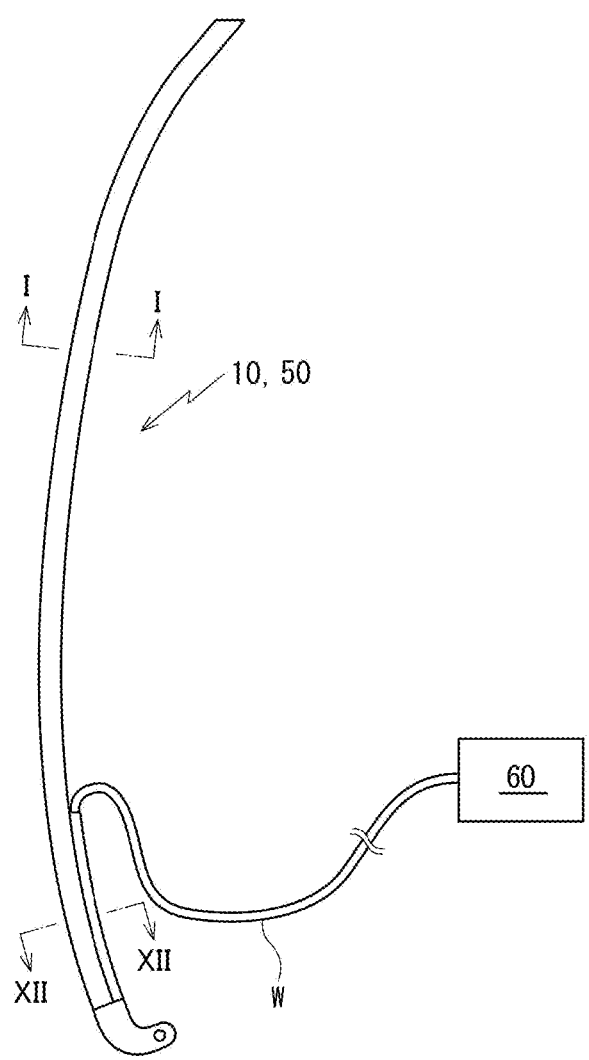
FIG. 10 is a side view of a protector illustrated in FIG. 9 with a sensor.
Figure 11:
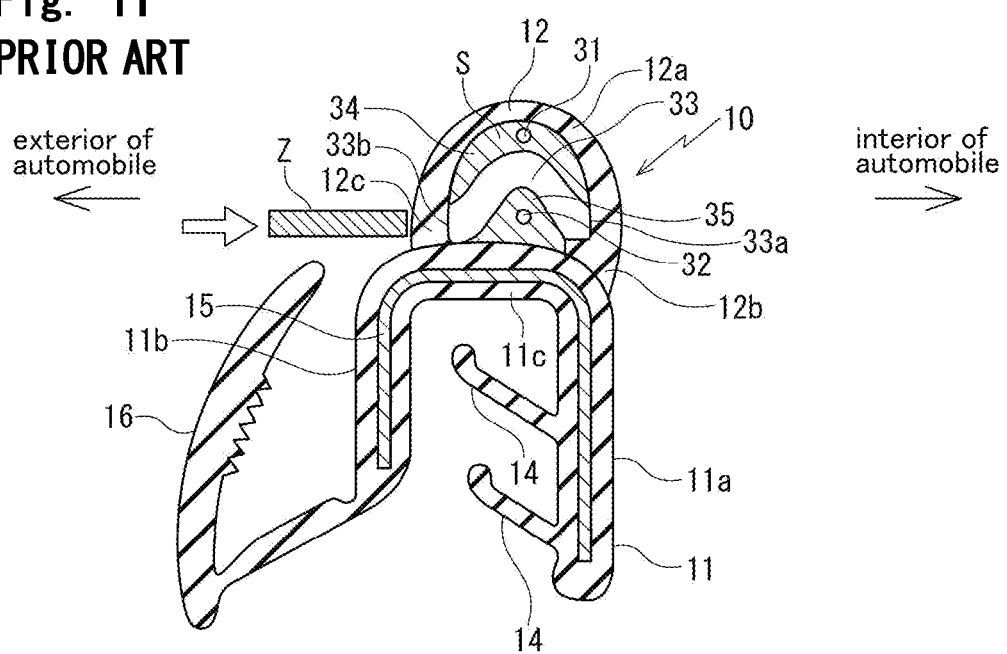
FIG. 11 is an enlarged cross-sectional view of a conventional protector taken along line I-I of FIG. 10 with a sensor.
Figure 12:
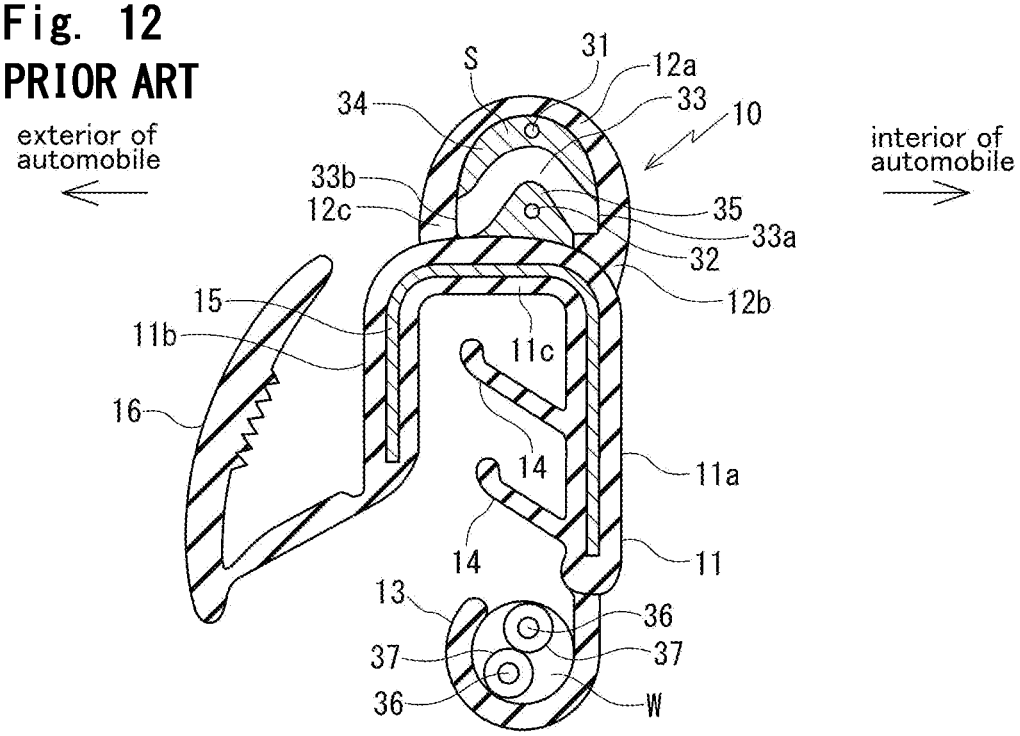
FIG. 12 is an enlarged cross sectional view of the conventional protector taken along line XII-XII of FIG. 10.

The protector 50 couples to a flange F of a sliding door 1 of the automobile. The flange F protrudes toward a front part of the automobile body from a front edge of the sliding door 1. The sliding door 1 moves between at least two positions to open and close a door opening of the automobile body of the automobile illustrated in FIG. 9. The hollow part 52 includes a sensor (pressure sensitive sensor) S. When an object including part of a human body, e.g. fingers, hands, or legs, is disposed between the sliding door 1 (may also be a front door or a side door) and the opening, and makes contact with the hollow part 52, an electric signal provides the indication that the object is in the opening. The protector 50 illustrated in FIG. 1 and a conventional protector 10 illustrated in FIG. 11 share the configuration illustrated in FIG. 10 in common. FIG. 1 is an enlarged cross-sectional view of the protector 50 taken along line I-I of FIG. 10 with the sensor S fixed. The protector 50 illustrated in FIG. 1 differs from the conventional protector 10 illustrated in FIG. 11 in cross-sectional shapes of a hollow part 52, a space 53, and a second conductive part 55 on a lower part of the hollow part. When constituents or items correspond to those in prior arts, the same symbols are used.

As illustrated in FIG. 1, the protector 50 includes the installation base member 11, the hollow part 52, and the sensor S. The installation base member 11 directly couples to the flange F. The installation base member 11 has a substantially U-shaped cross section including an inner-cabin side wall 11a, an outer-cabin side wall 11b, and a connecting wall 11c. The hollow part 52 is integrally formed with the installation base member 11 and has a shape of a tube. The hollow part 52 makes contact with the object when the object including fingers is disposed between the front edge of the sliding door 1 and the opening. The front edge faces the opening. The sensor S is fixed in the hollow part 52 and outputs the corresponding electric signal upon detecting the object. The hollow part 52 has core wires (electrode wires) 31, 32, rubber like elastic bodies 54, 55, and a space 53. The core wires 31, 32 extend in an upper and lower direction, or longitudinal direction which is a direction parallel to the peripheral edge of the opening, of the hollow part 52. Each of the rubber like elastic bodies 54, 55 have a respective one of the core wires 31, 32 embedded. The rubber like elastic bodies 54, 55 have electric conductivity. The space 53 is positioned between the rubber like elastic bodies 54, 55. The rubber like elastic bodies 54, 55, which have electric conductivity, include electric conductive rubber mainly composed of synthetic rubber including EPDM. The sensor S is integrally formed with the hollow part 52. The hollow part 12 does not have electric conductivity.

The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b.

The hollow part 52 is integrally formed with the connecting wall 11c. A top end part of the hollow part 52 extends toward the front part of the automobile body.

The hollow part 52 has an inner-cabin side end 52b and an outer-cabin side end 52c. Each of the inner-cabin side end 52b and the outer-cabin side end 52c are connected with the connecting wall 11c. The inner-cabin side end 52b and the outer-cabin side end 52c are at a distance from each other along the installation base member 11.

In this embodiment, the inner-cabin side end 52b is connected with a corner where the connecting wall 11c is connected with the inner-cabin side wall 11a. The outer-cabin side end 52c is connected with part of the connecting wall 11c slightly closer to the interior of the automobile body than a corner where the connecting wall 11c is connected with the outer-cabin side wall 11b. More specifically, the outer-cabin side end 52c is connected with the part of the connecting wall 11c closer to the exterior of the automobile body than a central line which divides the installation base member 11 in cross section in two equal halves in an inner-cabin and outer-cabin direction.

The rubber like elastic bodies 54, 55, which have electric conductivity, include a first conductive part 54 on an upper part of the hollow part and the second conductive part 55. The second conductive part 55 is positioned within the hollow part 52 between the inner-cabin side end 52b and the outer-cabin side end 52c adjacent the installation base member 11 and the first conductive part 54 is spaced apart from the second conductive part 55. The first conductive part 54 has the core wire 31 embedded at the center and the second conductive part 55 has the core wire 32 embedded at the center. The rubber like elastic bodies 54, 55 commonly include solid materials without air bubbles.

Shapes and positions of the first and second conductive parts 54, 55 in the hollow part 52 define the shape of the space 53 in cross section between first and second conductive parts 54, 55. In this embodiment, the space 53 has a substantially U-shaped cross section with an opening of the U shape facing the installation base member 11. Also, an inner-cabin space end 53a and an outer-cabin space end 53b of the space 53 are defined on an inner surface of an outer coat 52a of the hollow part 52.

The inner-cabin space end 53a is defined on the inner surface of the outer coat 52a between an inner-cabin side apex 52d and the inner-cabin side end 52b. The outer-cabin space end 53b is defined on the inner surface of the outer coat 52a between an outer-cabin side apex 52e and the outer-cabin side end 52c. The inner-cabin side and outer-cabin side apexes 52d, 52e will be discussed hereinafter.

Part of the outer-cabin space end 53b is defined on the connecting wall 11c as well as the inner surface of the outer coat 52a. The inner-cabin space end 53a is not defined on the connecting wall 11c.

Figure 2:
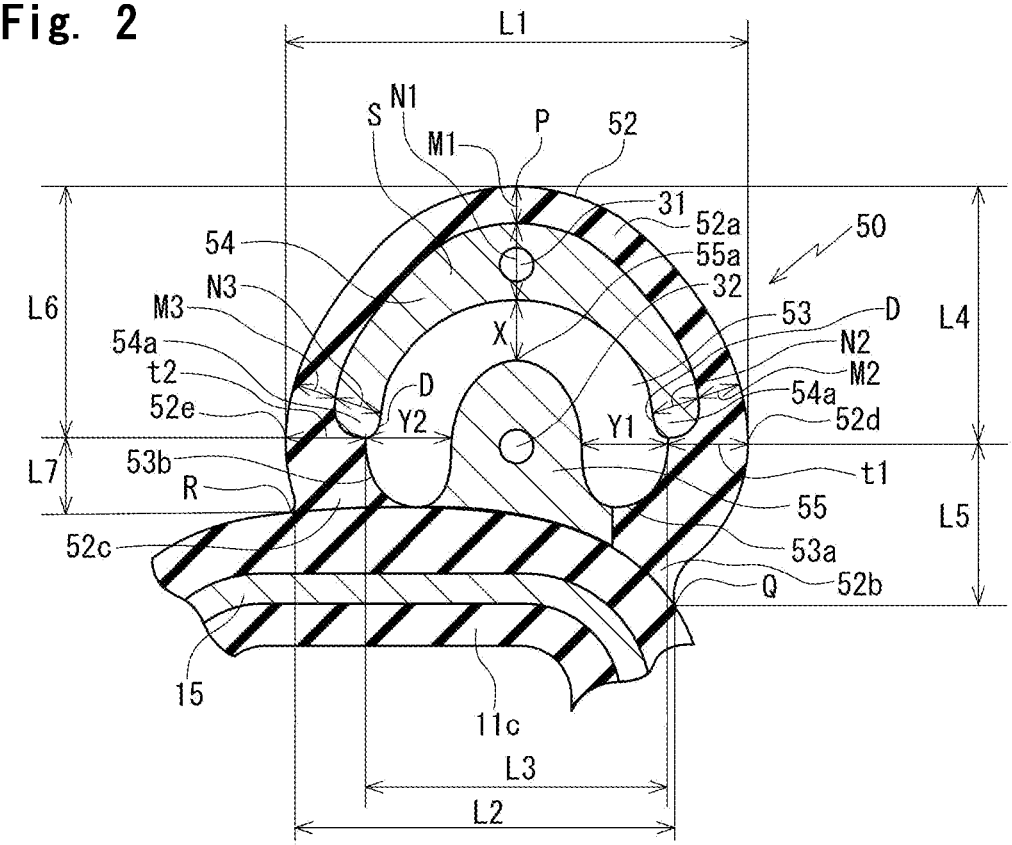
FIG. 2 is an enlarged cross-sectional view of the principal components of the protector illustrated in FIG. 1.

As illustrated in FIG. 2, the hollow part 52 includes the outer coat 52a. The outer coat 52a includes an inner-cabin side part and an outer-cabin side part. The inner-cabin side part extends between a top end P of the hollow part 52 and the inner-cabin side end 52b, and is curved toward the interior of the automobile body with the inner-cabin side apex 52d on a part closest to the interior of the automobile body. The outer-cabin side part extends between the top end P and the outer-cabin side end 52c, and is curved toward the exterior of the automobile body with the outer-cabin side apex 52e on a part closest to the exterior of the automobile body. The hollow part 52 in cross section bends in a front and rear direction of the automobile body in the same manner as a pantograph.

The inner-cabin side apex 52d and the outer-cabin side apex 52e have curved surfaces. A distance on a curvilinear surface between the top end P and the inner-cabin side apex 52d is longer than a distance on the curvilinear surface between the inner-cabin side apex 52d and the inner-cabin side end 52b. A distance on the curvilinear surface between the top end P and the outer-cabin side apex 52e is longer than a distance on the curvilinear surface between the outer-cabin side apex 52e and the outer-cabin side end 52c.

More specifically, as illustrated in FIG. 2, a distance L5 in a height direction between the inner-cabin side apex 52d and a part Q of the inner-cabin side end 52b closest to the interior of the automobile body is shorter than a distance L4 in the height direction between the top end P and the inner-cabin side apex 52d. In the same manner, a distance L7 in the height direction between the outer-cabin side apex 52e and a part R of the outer-cabin side end 52c closest to the exterior of the automobile body is shorter than a distance L6 in the height direction between the top end P and the outer-cabin side apex 52e.

More specifically, as illustrated in FIG. 2, the distance L5 is 0.7 time as long as the distance L4, and the distance L7 is 0.3 time as long as the distance L6.

The outer coat 52a has a substantially uniform thickness M1, M2, M3 in cross section between the top end P (thickness M1) and a part (thickness M2) of the outer coat 52a closer to the inner-cabin side apex 52d than the top end P and between the top end P (thickness M1) and a part (thickness M3) of the outer coat 52a closer to the outer-cabin side apex 52e than the top end P. The first conductive part 54, including parts closer to the installation base member 11 than an apex 55a of the second conductive part 55, has a thickness N1, N2, N3 greater than the thickness M1, M2, M3.

The thicknesses of the outer coat 52a are gradually increased toward the inner-cabin side apex 52d from the part of the outer coat 52a closer to the inner-cabin side apex 52d than the top end P and toward the outer-cabin side apex 52e from the part of the outer coat 52a closer to the outer-cabin side apex 52e than the top end P.

In this embodiment, the outer coat 52a has a uniform thickness "t1" between the inner-cabin side apex 52d and the inner-cabin side end 52b, and a uniform thickness "t2" between the outer-cabin side apex 52e and the outer-cabin side end 52c.

The second conductive part 55 has a hanging-bell-shaped cross section. The space 53 has a width X at the center in cross section in the front and rear direction of the automobile body, or the upper and lower direction of the hollow part 52. The width X is gradually increased toward the inner-cabin side apex 52d and toward the outer-cabin side apex 52e, and the space 53 has widths Y1, Y2 on the inner-cabin side apex 52d and on the outer-cabin side apex 52e greater than at least one other part of the space 53. The widths Y1, Y2 are gradually decreased toward the installation base member 11 from the inner-cabin side apex 52d and from the outer-cabin side apex 52e.

The inner-cabin space end 53a and the outer-cabin space end 53b have curved surfaces and are defined on the inner surface of the outer coat 52a.

The first conductive part 54 has a U-shaped cross section. Lower parts 54a of the first conductive part 54 are closer to the installation base member 11 than the apex 55a of the second conductive part 55. Lower ends of the first conductive part 54 are rounded to have semicircular shapes, not edge shapes of acute angles. Also, each of lower ends of the first conductive part 54 have a respective one of protrusions D formed. Each of the protrusions D extend to protrude inside the space 53, or toward the second conductive part 55, from the inner surface of the outer coat 52a, and are formed on a respective one of uneven bases. Accordingly, when the convex substance Z, illustrated in dotted line in FIG. 1, diagonally touches the hollow part 52 with an inclination of 70 degrees relative to the front and rear direction of the automobile body while passengers are getting on or off the automobile, the hollow part 52 bends with the protrusions D, not the outer coat 52a, coming into contact with the second conductive part 55. The protrusions D are closer to the inside of the space 53 than the outer coat 52a. In other words, the first and second conductive parts 54, 55 come into contact with each other easily if the convex substance Z slightly touches and bends the hollow part 52 or touches the hollow part 52 from any direction. This configuration increases the contact (point of contact) between the first and second conductive parts 54, 55 with each other, to prevent the first and second conductive parts 54, 55 from passing each other on the point of contact.

Each of the protrusions D, which are formed on the inner surface of the lower ends of the first conductive part 54, extend to project toward the second conductive part 55 from the inner surface of the outer coat 52a and are formed on the respective one of uneven bases. An entire surface between a lower edge on the inner surface of the first conductive part 54 and the protrusion D is smooth without a bending point. An entire surface between a part of the first conductive part 54 slightly closer to the top end P than the protrusion D on the inner surface of the first conductive part 54 and the protrusion D is smooth without the bending point.

The protrusion D, which is smooth without the bending point, is more suitable for the inner surface of the lower end of the first conductive part 54 than a convex-shaped part for the follow reasons. The convex-shaped part includes the bending point, or a singular part, and is not smooth. The singular part partially protrudes toward the second conductive part 55 and comes into contact with the second conductive part 55 easily when the hollow part 52 bends and deforms. The singular part, however, can be unstable in sensibility depending on the way the hollow part 52 bends.

In addition, the convex-shaped part can narrow a contact area Sa between the first and second conductive parts 54, 55, to increase resistance R. This hampers sufficient electric conductivity of the first and second conductive parts 54, 55 and may yield an area that does not sense an ON resistance.

As illustrated in FIG. 2, a distance L1 is longer than at least one other part of the hollow part 52 in cross section in the inner-cabin and outer-cabin direction. The distance L1 is between the inner-cabin side apex 52d and the outer-cabin side apex 52e. The distance L1 is longer than a distance L2. The distance L2 is between the part Q and the part R.

The distance L2 is longer than a distance L3. The distance L3 is longer than at least one other part of the space 53 in the inner-cabin and outer-cabin direction.

The installation base member 11 and the hollow part 52 are formed by extrusion molding and include a rubber like elastic body without electric conductivity. The rubber like elastic body is composed of synthetic rubber such as EPDM, and thermoplastic elastomer such as TPO, TPS. Upper and lower side terminal parts of the protector 50 relative to the automobile body are formed by die molding to arrange external shapes of the terminal parts. The hollow part 52, which necessitates flexibility, may include a foamed sponge material. In the same manner, the installation base member 11 may include the foamed sponge material.

In this embodiment, the hollow part 52 has a material hardness of 72 such that the hollow part 52 is temperately increased in load, not to excess. Conventional articles have a material hardness of substantially 67.

The inner-cabin side part of the outer coat 52a extends between the top end P and the inner-cabin side end 52b, and is curved toward the interior of the automobile body with the inner-cabin side apex 52d on the part closest to the interior of the automobile body. The outer-cabin side part of the outer coat 52a extends between the top end P and the outer-cabin side end 52c, and is curved toward the exterior of the automobile body with the outer-cabin side apex 52e on the part closest to the exterior of the automobile body. This configuration improves bendability of the hollow part 52 in the front and rear direction of the automobile body in the same manner as the pantograph and sensibility of the sensor.

In addition, the first conductive part 54 includes the parts closer to the installation base member 11 than the apex 55a. Also, each of the lower ends of the first conductive part 54 have the respective one of protrusions D formed. Each of the protrusions D extend to protrude toward the second conductive part 55 from the inner surface of the outer coat 52a and are formed on the respective one of uneven bases. This configuration eliminates "edge shapes" known in the art on lower ends of the first conductive part 54.

This configuration eliminates the need for the manufacture of dies as well. The dies that have been used to form the edge shapes by extrusion molding are difficult to manufacture.

Also, the protrusions D increase thicknesses of the lower ends of the first conductive part 54. The thick parts on the lower ends keep the precise sensitivity required for tactile detection of the objects stable when the convex substance Z diagonally approaches and touches the hollow part 52, with the inclination of 70 degrees toward the interior or the exterior of the automobile body relative to the front and rear direction, for example, to bend and bring the thick parts into contact with the second conductive part 55. On the other hand, thin parts, not the thick parts, on the lower ends of the first conductive part 54 can degrade the precise sensitivity under the same condition.

In addition, the outer coat 52a has the substantially uniform thickness M1, M2, M3 in cross section between the top end P (thickness M1) and the part (thickness M2) of the outer coat 52a closer to the inner-cabin side apex 52d than the top end P and between the top end P (thickness M1) and the part (thickness M3) of the outer coat 52a closer to the outer-cabin side apex 52e than the top end P. Also, the first conductive part 54, including the parts closer to the installation base member 11 than the apex 55a, has the thickness N1, N2, N3 greater than the thickness M1, M2, M3 of the outer coat 52a. This configuration hardly yields the area that does not sense the ON resistance under the unevenness such as geometric unevenness of the protector 50 in cross section when formed by extrusion molding, geometric unevenness of the automobile when manufactured, and positional unevenness of the protector 50 when coupled to the automobile, and keeps the precise sensitivity more stable.

In addition, the thicknesses of the outer coat 52a are gradually increased toward the installation base member 11 from the inner-cabin side apex 52d and from the outer-cabin side apex 52e. This configuration keeps deformation volume smaller in the inner-cabin and outer-cabin direction of the hollow part 52, and keeps friction as well as amount of bite by the convex substance Z lower.

Accordingly, if the convex substance, key for example, strongly touches the parts of the hollow part 52 increased in thickness while passengers are getting on or off the automobile, the parts would not be damaged or torn. The hollow part 52, not damaged or torn, prevents infiltration of water, and therefore, sensor function is not affected. This configuration prevents malfunction including improper opening or closing of the sliding door.

Figure 3:
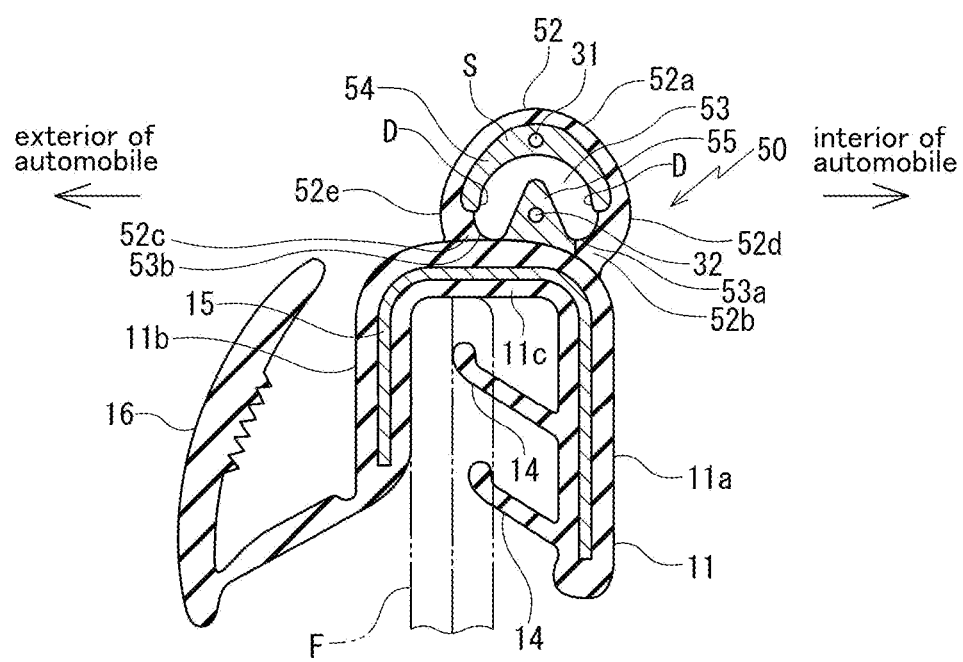
FIG. 3 is an enlarged cross-sectional view of a protector according to another embodiment of the present invention taken along line I-I of FIG. 10 with a sensor.

In this embodiment, as illustrated in FIG. 1 and FIG. 2, the second conductive part 55 has the hanging-bell-shaped cross section. The space 53 has the width X at the center. The width X is gradually increased toward the inner-cabin side apex 52d and toward the outer-cabin side apex 52e, and the space 53 has widths Y1, Y2 on the inner-cabin side apex 52d and on the outer-cabin side apex 52e greater than at least one other part of the space 53. The widths Y1, Y2 are gradually decreased toward the installation base member 11 from the inner-cabin side apex 52d and from the outer-cabin side apex 52e. The second conductive part 55 is not limited to the hanging-bell shape. In some embodiments, as illustrated in FIG. 3, the second conductive part 55 has a ridge-shaped cross section. The ridge-shaped cross section has the apex 55a thicker than at least one other part of the second conductive part 55 and slopes toward the inner-cabin side end 55a and the outer-cabin side end 55b from the apex 55a. In this modification, the space 53 has the substantially uniform width in cross section.

The inner-cabin space end 53a and the outer-cabin space end 53b have curved surfaces and are defined on the inner surface of the outer coat 52a. The part of the outer-cabin space end 53b is defined on the connecting wall 11c as well as the inner surface of the outer coat 52a. This configuration further improves bendability of the hollow part 52 in the front and rear direction of the automobile body and sensibility of the sensor.

In some embodiments, the hollow part 52 and the sensor S are integrally formed, and the installation base member 11 is separately formed. Illustration of this configuration is omitted.

In this embodiment, the installation base member 11 has the plurality of holding lips 14, 14 formed inside and the core 15, having the substantially U-shaped cross section, embedded. The installation base member 11 is not limited to this configuration. In some embodiments, the installation base member 11 has a singular holding lip 14 or does not have the core 15 embedded.

Below are comparison on the precise sensitivity of the sensor S required for tactile detection of the objects between the first conductive part 54 of this embodiment illustrated in FIGS. 1, 2 without the edge shapes and the first conductive part 54 of the comparative embodiment illustrated in FIG. 4 with the edge shapes.

Figure 4:
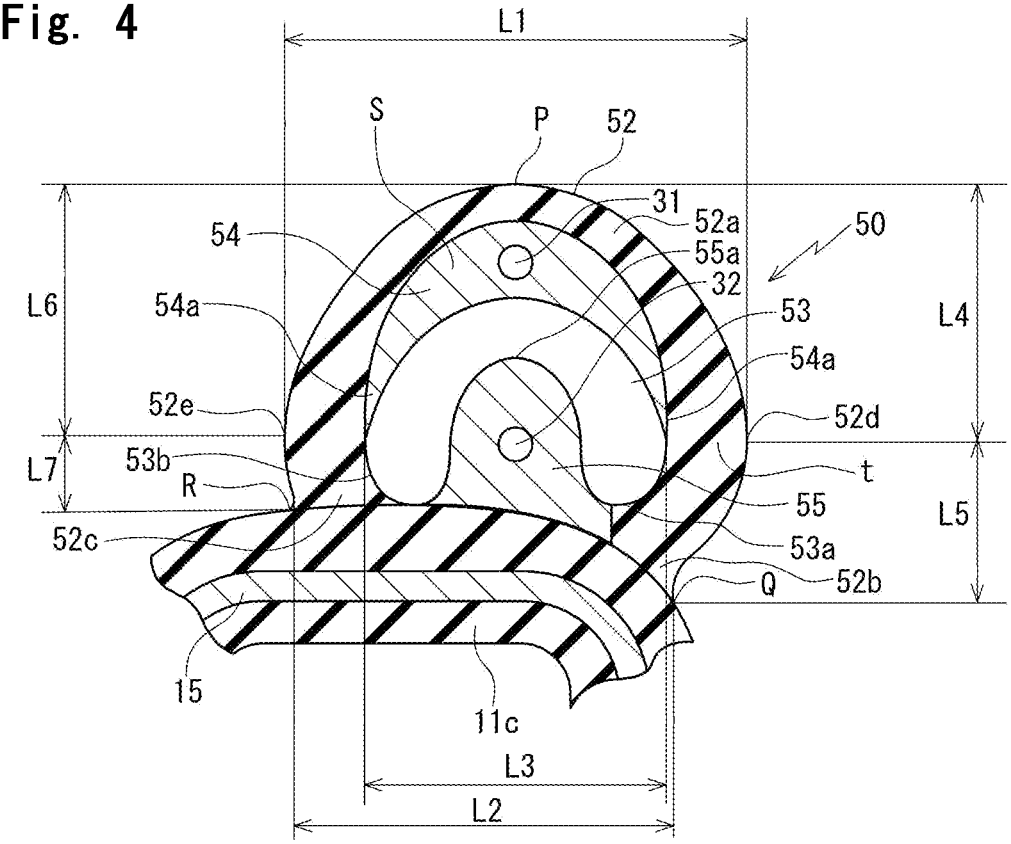
FIG. 4 is an enlarged cross-sectional view of a protector according to a comparative embodiment taken along line I-I of FIG. 10 with a sensor, with a hollow part altered.

The protector 50 of the comparative embodiment illustrated in FIG. 4 eliminates the protrusions D included in the present embodiment illustrated in FIGS. 1, 2, and includes the edge shapes instead. Except for the shape of the lower ends of the first conductive part 54, the comparative embodiment and the present embodiment share the configuration of the protector 50 in common including the shape and the material.

The first conductive part 54 in contact with the second conductive part 55 generates resistance R written as $R = \rho \times L/Sa$, where "$\rho$" is a volume resistivity of the first and second conductive parts 54, 55, "L" is a distance between the core wires 31, 32, and "Sa" is the contact area between the conductive members.

An indenter 100 used to press the hollow part 52 is 4 mm in width.

Figure 5:
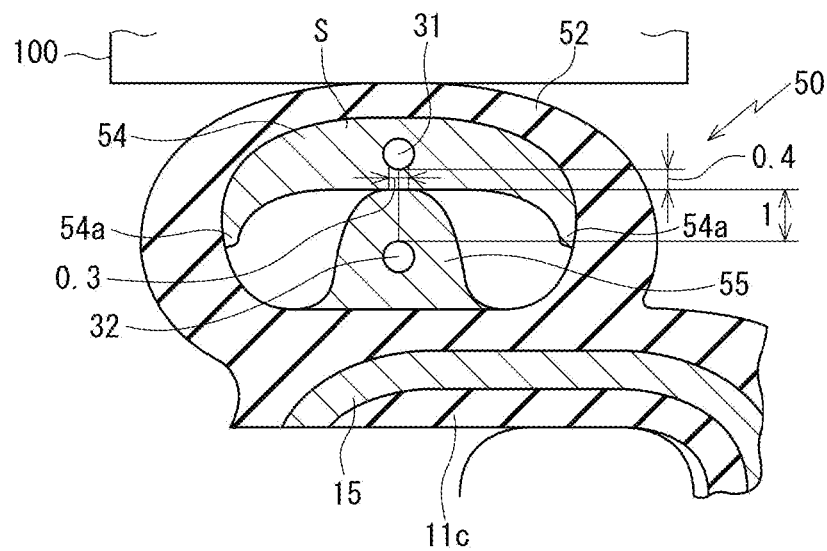
FIG. 5 is an enlarged cross-sectional view of the protector illustrated in FIG. 4 under pressurization at an angle of 0 degree.

First, as illustrated in FIG. 5, the protector 50 of the comparative embodiment illustrated in FIG. 4 is pressed using the indenter 100 toward a lower part of the hollow part 52 from an upper part relative to an upper and lower direction, or front and rear direction of automobile body. The resistance R at an angle of 0 degree is written as $$R = \rho(=75\ \Omega\cdot mm) \times L(=(1\ mm + 0.4\ mm))/Sa(=0.3\ mm \times 4\ mm\ (width\ of\ indenter)) = 87.5\ \Omega$$

The resistance R of 87.5Ω does not affect the conductivity.

Figure 6:
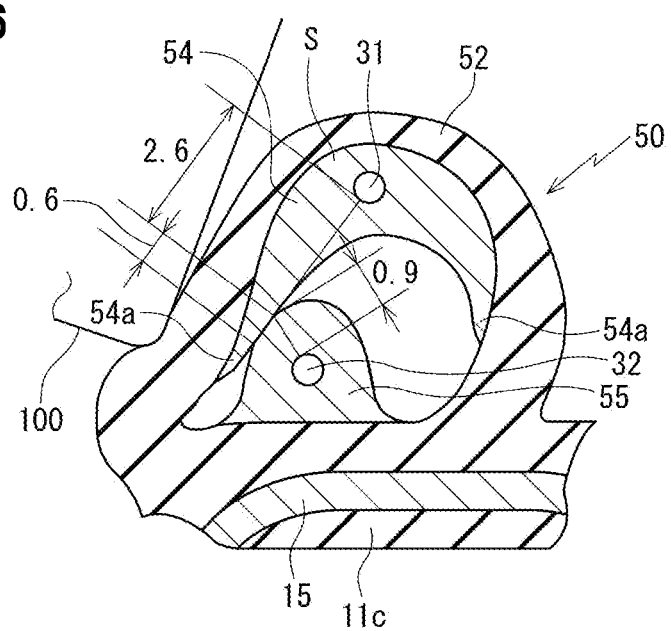
FIG. 6 is an enlarged cross-sectional view of the protector illustrated in FIG. 4 under pressurization at an angle of 70 degrees.

Next, as illustrated in FIG. 6, the protector 50 of the comparative embodiment illustrated in FIG. 4 is diagonally pressed using the indenter 100 with an inclination of 70 degrees toward the exterior of the automobile body relative to the upper and lower direction of the hollow part 52, or front and rear direction of automobile body. The resistance R under the diagonal pressurization at the angle of 70 degrees is written as $$R = \rho(=75\ \Omega\cdot mm) \times L(=(2.6\ mm + 0.9\ mm))/Sa(=0.6\ mm \times 4\ mm\ (width\ of\ indenter)) = 109.4\Omega$$

The resistance R of 109.4Ω does not affect the conductivity.

Figure 7:
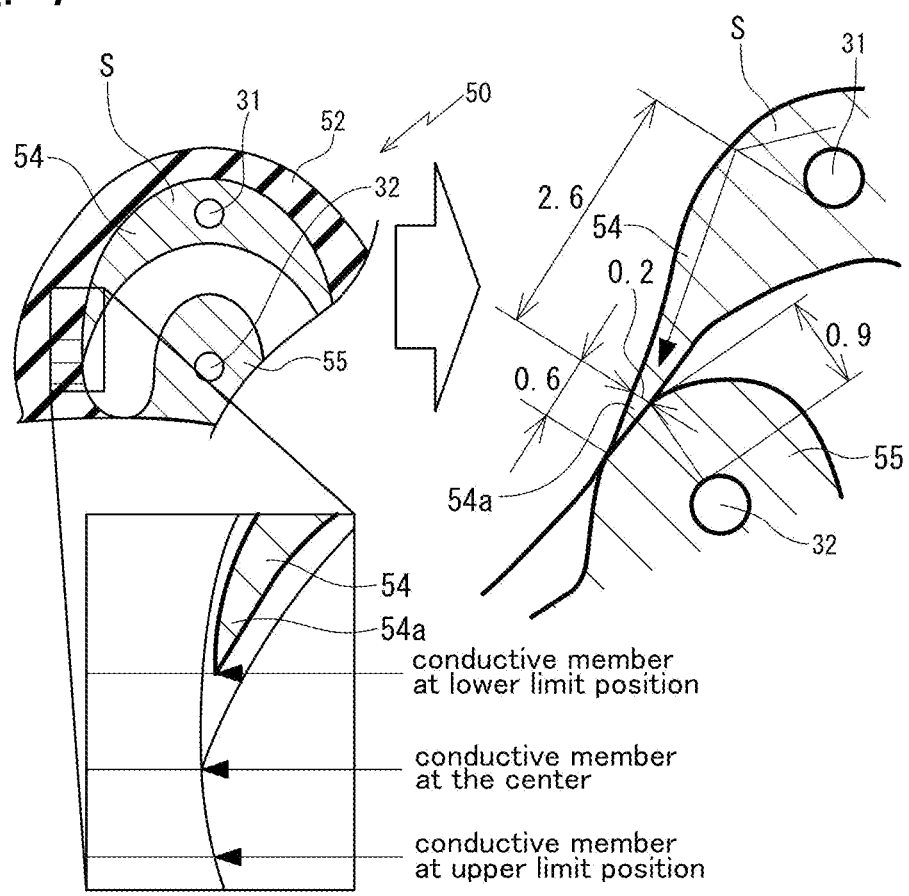
FIG. 7 is an enlarged cross-sectional view of the protector illustrated in FIG. 4 under pressurization at an angle of 70 degrees with a conductive member unevenly placed.

Next, the protector 50 of the comparative embodiment illustrated in FIG. 4 under the following unevenness is discussed: unevenness in the volume resistivity ρ increased by 25 Ω·mm in an upper limit direction; unevenness in the distance L increased by 1 mm due to positional unevenness between the core wires; and positional unevenness, illustrated in FIG. 7, of the edge shape of the lower end of the first conductive part 54 shifted toward the upper part of the hollow part 52. The edge shape, which affects the contact area Sa, is 0.2 mm in thickness. The resistance R under the unevenness is written as $$R = \rho(=75\ \Omega mm + 25\ \Omega\cdot mm) \times L(=(2.6\ mm + 0.9\ mm + 1\ mm))/Sa(=0.2\ mm \times 4\ mm\ (width\ of\ indenter)) = 562\Omega$$

The resistance R of 562Ω hampers sufficient conductivity, and needs to be decreased to 500Ω or less. It also decreases robustness in function.

In FIG. 7, the contact area Sa is 0.6 mm in contact width, and the conductive member on a contact part is 0.2 mm in thickness. The thickness of 0.2 mm is essential to the decrease of the resistance R. The contact area Sa is written as 0.8 (cross section where electric current flows)=0.2 mm×4 mm (width of indenter).

Next, the protector 50 of this embodiment (FIG. 1 and FIG. 2) under the following unevenness similar to those in the comparative embodiment is discussed: unevenness in the volume resistivity ρ increased by 25 Ω·mm in the upper limit direction; and the positional unevenness between the core wires increased by 1 mm. The thick parts, which affect the contact area Sa, of the lower ends of the first conductive part

Figure 8:
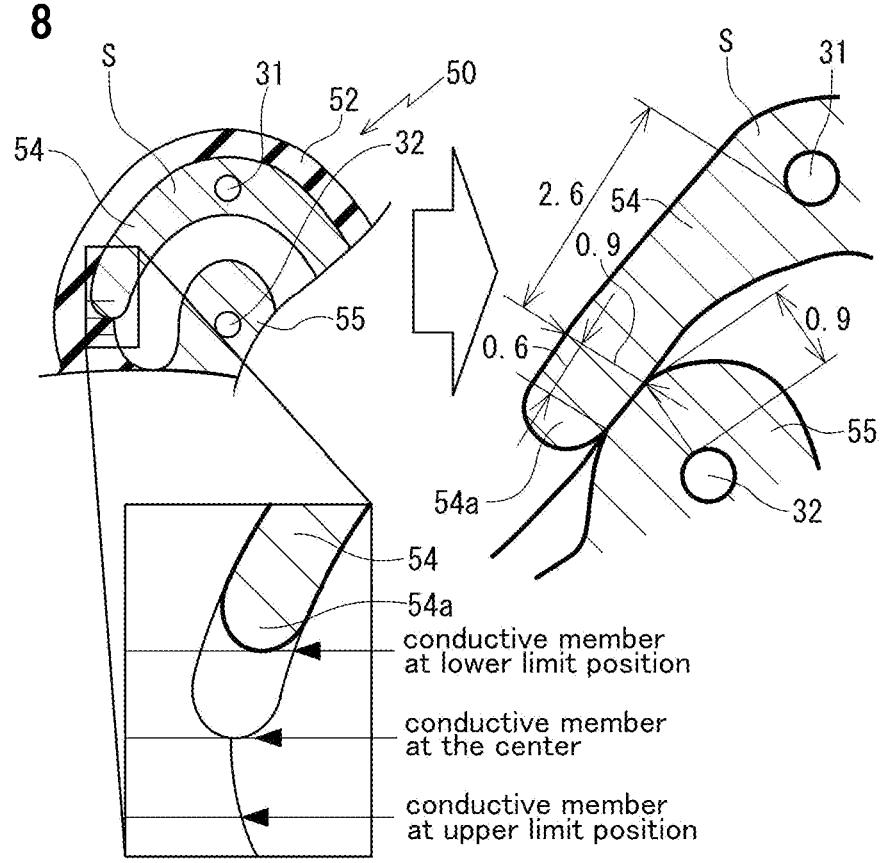
FIG. 8 is an enlarged cross-sectional view of the protector illustrated in FIG. 2 under pressurization at an angle of 70 degrees with a conductive member unevenly placed.

54 has the thicknesses N2, N3, and are 0.9 mm in thickness as illustrated in FIG. 8. The thicknesses N2, N3 are adjusted to 0.6 mm (same as the contact width of 0.6 mm) in consideration of the unevenness of plus or minus 0.3 mm.

Each of the protrusions D of this embodiment, which are formed on the inner surface of the lower ends of the first conductive part 54, extend to project toward the second conductive part 55 from the inner surface of the outer coat 52*a*, and are formed on the respective one of uneven bases. The entire surface between the lower edge on the inner surface of the first conductive part 54 and the protrusion D is smooth without the bending point. The entire surface between the part of the first conductive part 54 slightly closer to the top end P than the protrusion D on the inner surface of the first conductive part 54 and the protrusion D is smooth without the bending point. This configuration hardly allows the contact width to be less than 0.6 mm.

As a result, the resistance R under the diagonal pressurization at the angle of 70 degrees is written as $$R = \rho(=75 \ \Omega \cdot mm + 25 \ \Omega \cdot mm) \times L(=(2.6 \ mm + 0.9 \ mm + 1 \ mm))/Sa(=0.6 \ mm \times 4 \ mm \ (\text{width of indenter})) = 187.5\Omega$$

The resistance R of 187.5Ω keeps sufficient conductivity under the unevenness.

In FIGS. 7, 8, "conductive member at the center" is the shape of the conductive member under no unevenness, "conductive member at lower limit position" is the shape of the conductive member when the unevenness makes the contact area Sa narrowest, and "conductive member at upper limit position" is the shape of the conductive member when the unevenness makes the contact area Sa widest.

We claim:

1. A protector with a sensor, wherein the protector is operably couplable to a flange of a sliding door of an automobile, the flange protruding toward a front part of an automobile body of the automobile from a front edge of the sliding door, the sliding door movable between at least two positions to open and close a door opening of the automobile body, and the protector comprising:
    an installation base member operably couplable to the flange, the installation base member having a substantially U-shaped cross section including an inner-cabin side wall, an outer-cabin side wall, and a connecting wall which connects the side walls, wherein the installation base member is configured to extend in an upper and lower direction of the automobile body; and
    a hollow part unified with the connecting wall of the installation base member and configured to extend toward the front part of the automobile body, the hollow part having a shape of a tube, the hollow part having core wires, first and second conductive parts, and a space, each of the first and second conductive parts having a respective one of the core wires embedded therein, wherein the space is positioned between the first and second conductive parts, the hollow part has an inner-cabin side end and an outer-cabin side end each connected with the installation base member, the inner-cabin side end and the outer-cabin side end are at a distance from each other along the installation base member, the first conductive part is positioned at an upper part of the hollow part and the second conductive part is positioned at a lower part of the hollow part, the second conductive part has a convex shape in cross section of the hollow part, the second conductive part is positioned within the hollow part between the inner-cabin side end and the outer-cabin side end adjacent the installation base member, the first conductive part has a concave shape in the cross section of the hollow part, the first conductive part is spaced apart from the second conductive part, the first and second conductive parts are shaped and positioned in a manner that the space has a substantially U-shaped cross section, an opening of the U-shaped cross section faces the installation base member, and an inner-cabin space end and an outer-cabin space end of the space are defined on an inner surface of an outer coat of the hollow part,
    wherein:
    the protector is configured such that, when the protector is operably coupled to the flange of the sliding door of the automobile and an object is disposed between the sliding door and the opening and makes contact with the hollow part when the sliding door is moved towards a closed position, an electric signal provides an indication that the object is in the opening,
    an inner-cabin side part of the outer coat of the hollow part extends between a top end of the hollow part and the inner-cabin side end of the hollow part, the inner-cabin side part is shaped to curve toward an interior of the automobile body with an inner-cabin side apex on a part closest to the interior of the automobile body, and a distance in a height direction between the inner-cabin side apex and a part of the inner-cabin side end closest to the interior of the automobile body is shorter than a distance in the height direction between the top end and the inner-cabin side apex,
    an outer-cabin side part of the outer coat of the hollow part extends between the top end of the hollow part and the outer-cabin side end of the hollow part, the outer-cabin side part is shaped to curve toward an exterior of the automobile body with an outer-cabin side apex on a part closest to the exterior of the automobile body, and a distance in the height direction between the outer-cabin side apex and a part of the outer-cabin side end closest to the exterior of the automobile body is shorter than a distance in the height direction between the top end and the outer-cabin side apex,
    the first conductive part includes parts closer to the installation base member than an apex of the second conductive part,
    each of lower ends of the first conductive part have a respective one of protrusions formed, and each of the protrusions extend to protrude toward the second conductive part from the inner surface of the outer coat of the hollow part,
    the outer coat of the hollow part has a substantially uniform thickness in cross section from the top end of the hollow part to a position closer to the inner-cabin side apex than the top end, and the outer coat of the hollow part has the substantially uniform thickness in cross section from the top end to a position closer to the outer-cabin side apex than the top end, and
    the first conductive part including the parts closer to the installation base member than the apex of the second conductive part has a thickness greater than the substantially uniform thickness of the outer coat of the hollow part.

2. A protector with a sensor, wherein the protector is operably couplable to a flange of a sliding door of an automobile, the flange protruding toward a front part of an automobile body of the automobile from a front edge of the sliding door, the sliding door movable between at least two positions to open and close a door opening of the automobile body, and the protector comprising:

an installation base member operably couplable to the flange, the installation base member having a substantially U-shaped cross section including an inner-cabin side wall, an outer-cabin side wall, and a connecting wall which connects the side walls, wherein the installation base member is configured to extend in an upper and lower direction of the automobile body; and a hollow part unified with the connecting wall of the installation base member and configured to extend toward the front part of the automobile body, the hollow part having a shape of a tube, the hollow part having core wires, first and second conductive parts, and a space, each of the first and second conductive parts having a respective one of the core wires embedded therein, wherein the space is positioned between the first and second conductive parts, the hollow part has an inner-cabin side end and an outer-cabin side end each connected with the installation base member, the inner-cabin side end and the outer-cabin side end are at a distance from each other along the installation base member, the first conductive part is positioned at an upper part of the hollow part and the second conductive part is positioned at a lower part of the hollow part, the second conductive part has a convex shape in cross section of the hollow part, the second conductive part is positioned within the hollow part between the inner-cabin side end and the outer-cabin side end adjacent the installation base member, the first conductive part has a concave shape in the cross section of the hollow part, the first conductive part is spaced apart from the second conductive part, the first and second conductive parts are shaped and positioned in a manner that the space has a substantially U-shaped cross section, an opening of the U-shaped cross section faces the installation base member, and an inner-cabin space end and an outer-cabin space end of the space are defined on an inner surface of an outer coat of the hollow part, wherein:

the protector is configured such that, when the protector is operably coupled to the flange of the sliding door of the automobile and an object is disposed between the sliding door and the opening and makes contact with the hollow part when the sliding door is moved towards a closed position, an electric signal provides an indication that the object is in the opening, an inner-cabin side part of the outer coat of the hollow part extends between a top end of the hollow part and the inner-cabin side end of the hollow part, the inner-cabin side part is shaped to curve toward an interior of the automobile body with an inner-cabin side apex on a part closest to the interior of the automobile body, and a distance in a height direction between the inner-cabin side apex and a part of the inner-cabin side end closest to the interior of the automobile body is shorter than a distance in the height direction between the top end and the inner-cabin side apex, an outer-cabin side part of the outer coat of the hollow part extends between the top end of the hollow part and the outer-cabin side end of the hollow part, the outer-cabin side part is shaped to curve toward an exterior of the automobile body with an outer-cabin side apex on a part closest to the exterior of the automobile body, and a distance in the height direction between the outer-cabin side apex and a part of the outer-cabin side end closest to the exterior of the automobile body is shorter than a distance in the height direction between the top end and the outer-cabin side apex, the first conductive part includes parts closer to the installation base member than an apex of the second conductive part, each of lower ends of the first conductive part have a respective one of protrusions formed, and each of the protrusions extend to protrude toward the second conductive part from the inner surface of the outer coat of the hollow part, and thicknesses of the outer coat of the hollow part are gradually increased toward the installation base member from the inner-cabin side apex and from the outer-cabin side apex.

* * * * *